(12) United States Patent
Augustine et al.

(10) Patent No.: US 7,438,548 B2
(45) Date of Patent: Oct. 21, 2008

(54) APPARATUS FOR RAPIDLY HEATING AND COOLING A MOLD

(75) Inventors: Joseph G. Augustine, Tucson, AZ (US); Tulsie P. Sumeer, Tucson, AZ (US); Randy L. Prior, Oro Valley, AZ (US)

(73) Assignee: Engineering & Research Associates, Inc., Tucson, AZ (US)

( * ) Notice: Subject to any disclaimer, the term of this patent is extended or adjusted under 35 U.S.C. 154(b) by 0 days.

(21) Appl. No.: 11/555,172

(22) Filed: Oct. 31, 2006

(65) Prior Publication Data
US 2007/0256791 A1 Nov. 8, 2007

Related U.S. Application Data

(60) Provisional application No. 60/762,204, filed on Jan. 25, 2006, provisional application No. 60/732,118, filed on Oct. 31, 2005.

(51) Int. Cl.
*B29C 33/02* (2006.01)
(52) U.S. Cl. .............................. 425/174.8 E; 425/384; 425/393
(58) Field of Classification Search .................. 425/384, 425/174, 393, 174.8 R; 264/486
See application file for complete search history.

(56) References Cited

U.S. PATENT DOCUMENTS

| | | | |
|---|---|---|---|
| 3,888,647 A | * | 6/1975 | Breeden et al. ............ 65/29.19 |
| 4,013,860 A | | 3/1977 | Hosterman et al. |
| 4,186,292 A | | 1/1980 | Acker |
| 4,390,832 A | | 6/1983 | Taylor |
| 4,490,598 A | | 12/1984 | Minney et al. |
| 4,529,859 A | | 7/1985 | Minney et al. |
| 4,878,826 A | * | 11/1989 | Wendt .................. 425/384 |
| 4,914,267 A | | 4/1990 | Derbyshire |
| 5,088,911 A | | 2/1992 | Kumazaki |
| 5,160,396 A | | 11/1992 | Jensen et al. |
| 5,360,330 A | | 11/1994 | Jensen et al. |

* cited by examiner

*Primary Examiner*—Robert B Davis
(74) *Attorney, Agent, or Firm*—Cahill, von Hellens & Glazer

(57) ABSTRACT

A mold for forming, molding or welding thermoplastic tubing extends through the aperture of an apertured spool supporting an RF energized coil to inductively heat a center section of the mold. A source of air is channeled through a manifold to flow about the center section of the mold and through the space between the mold and the aperture in the spool to rapidly cool the mold. Thermal chokes on each side of the center section of the mold impede heat transfer and a heat sink connected to each thermal choke serves to dissipate any heat build up. The spool may be translated along the center section of the mold to a predetermined location commensurate with a predetermined heat profile. The mold includes a passageway extending therethrough for receiving the tubing; by appropriate dimensioning, the passageway will accommodate the use of a mandrel to support the tubing to be formed, molded or welded. The mold may be split to permit separation within the confines of the aperture in the spool and subsequent withdrawal of the formed, molded or welded tubing.

23 Claims, 11 Drawing Sheets

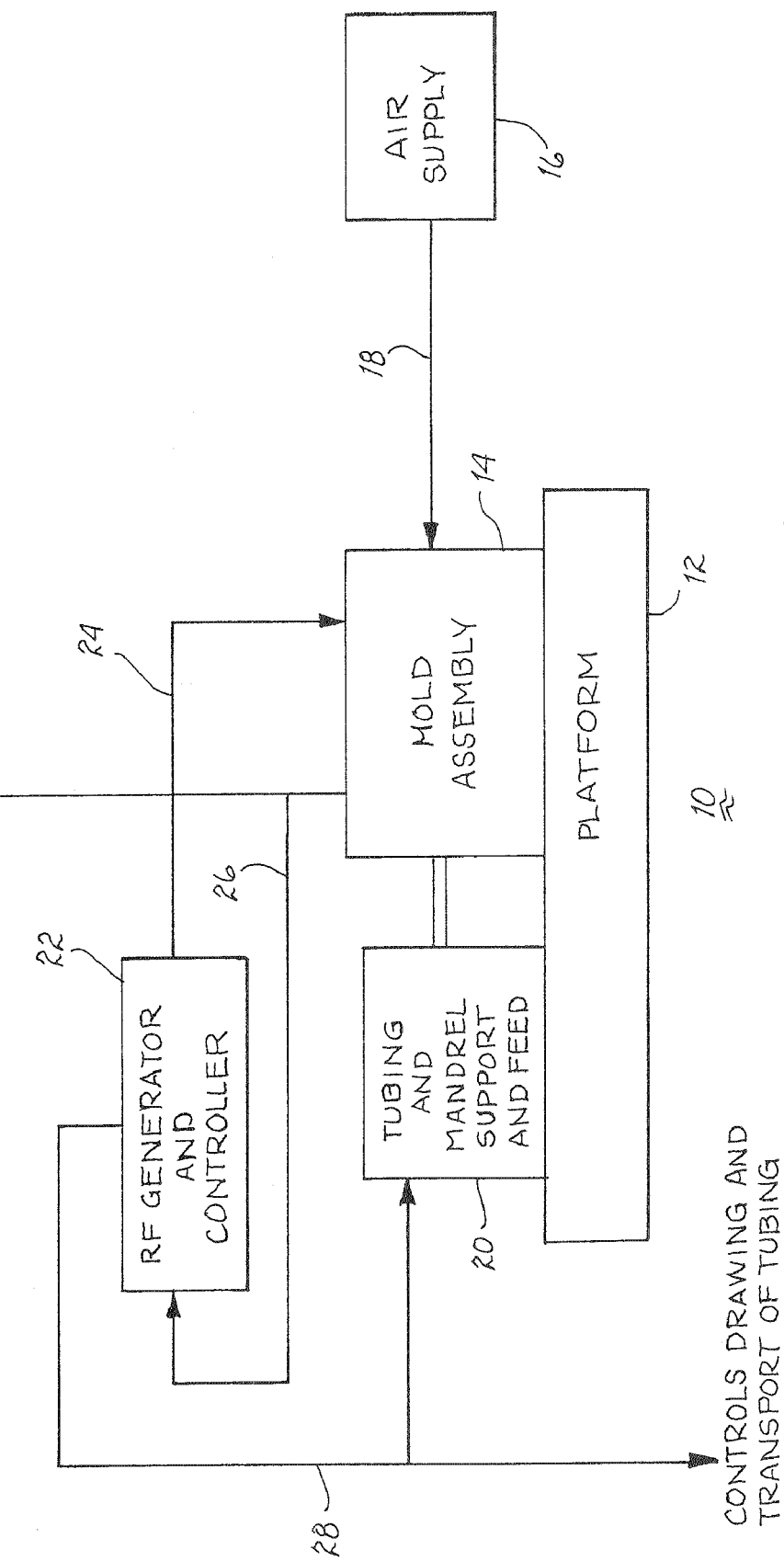

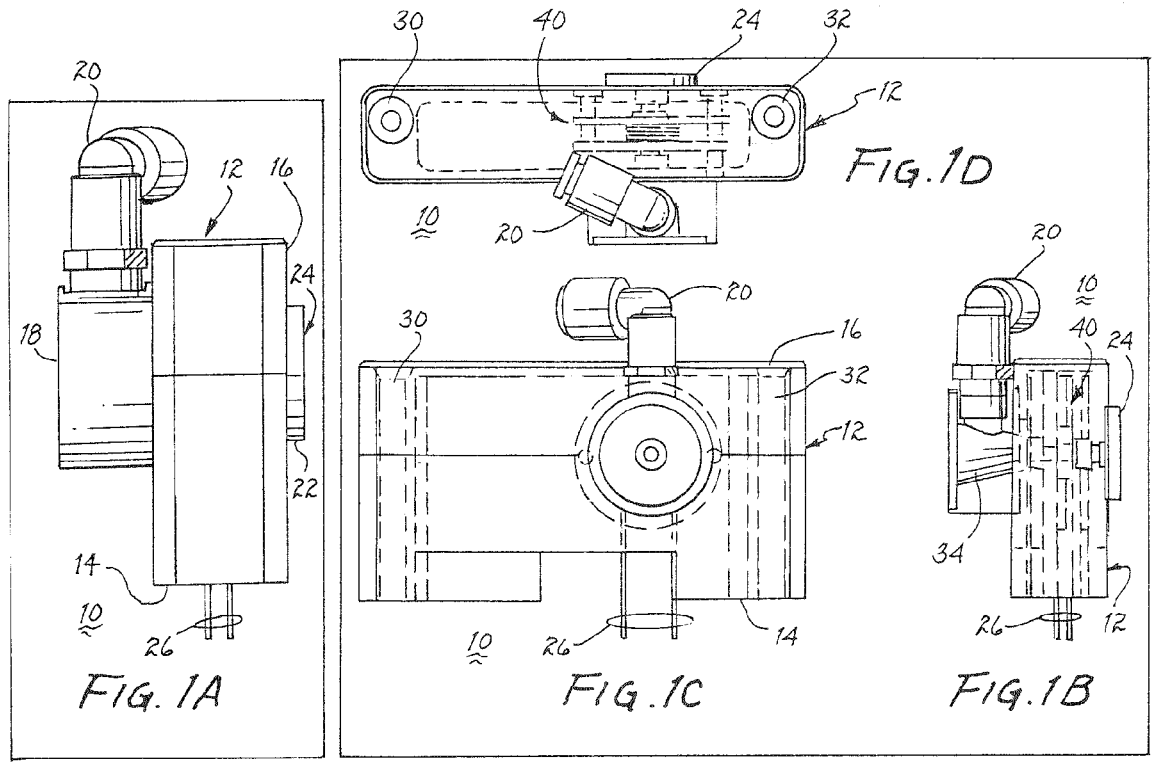
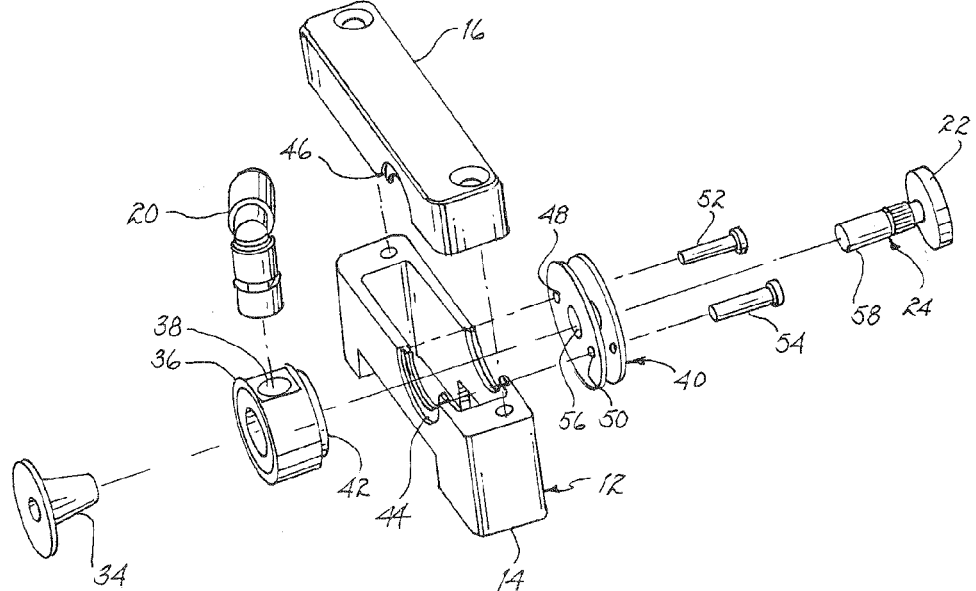

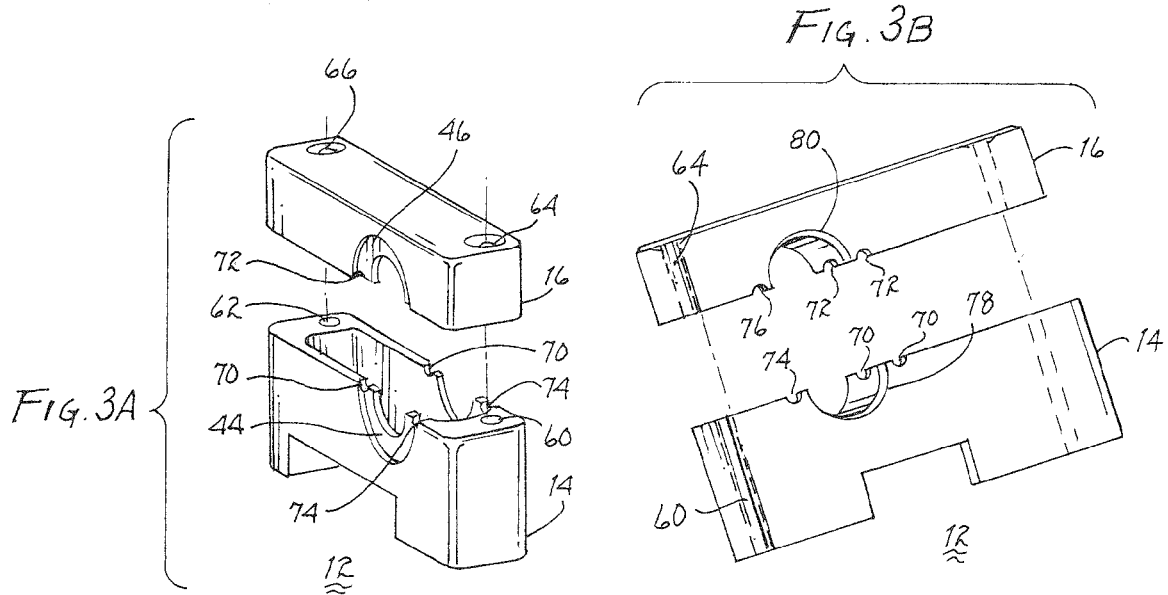
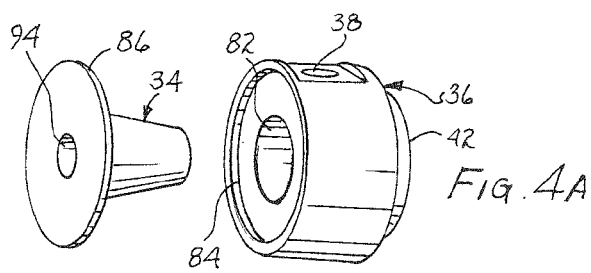
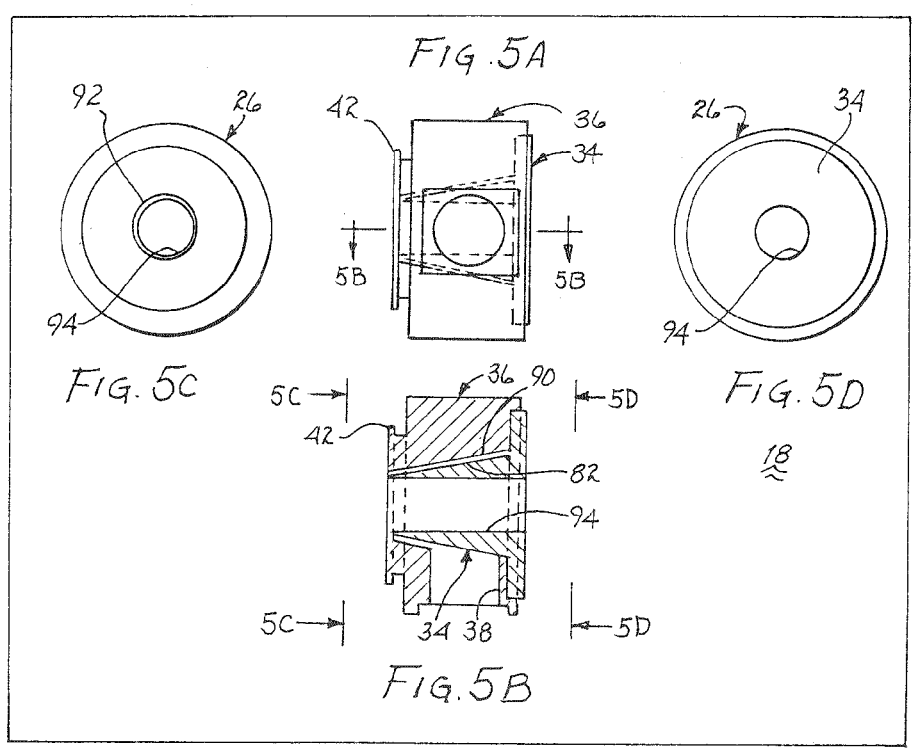

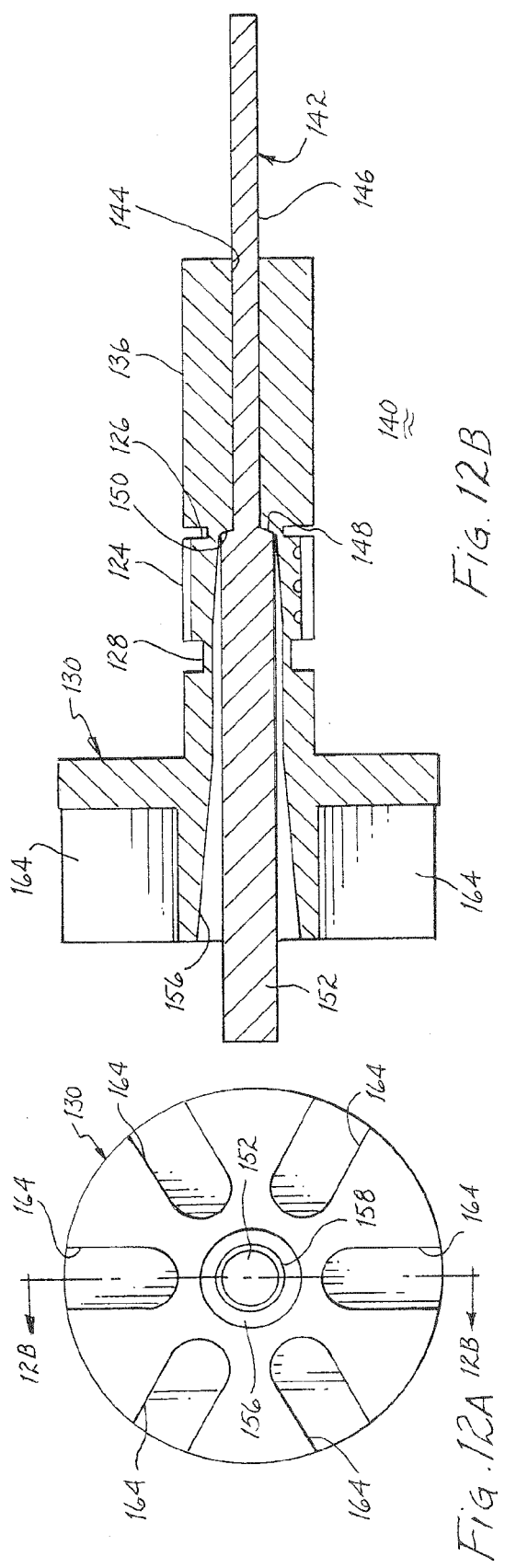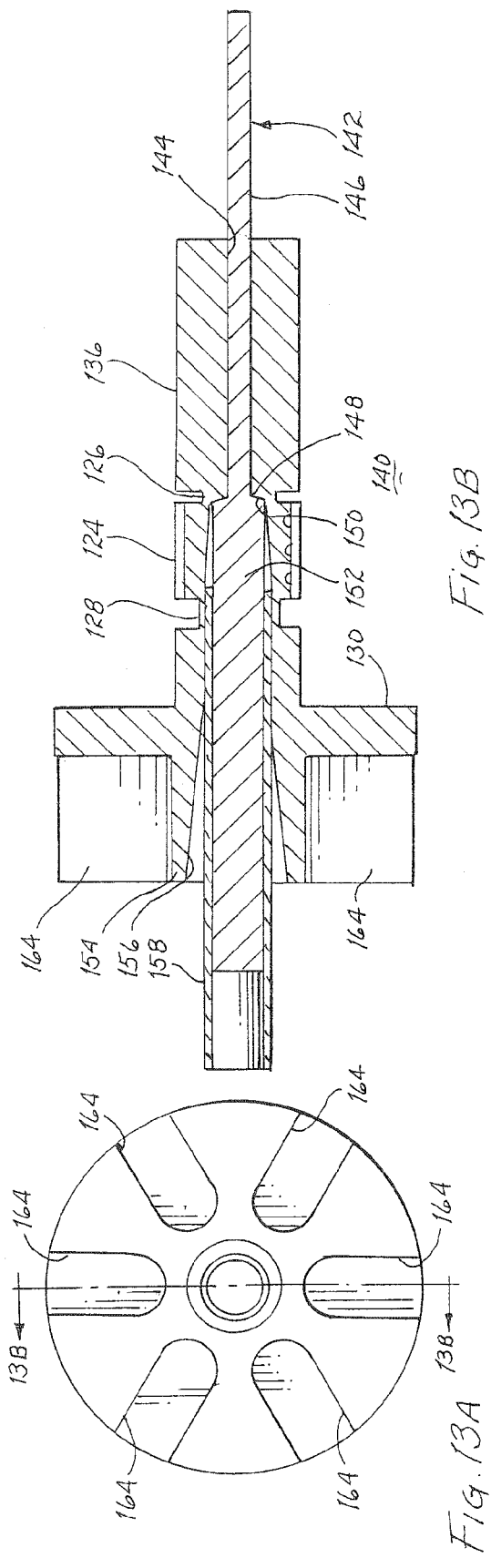

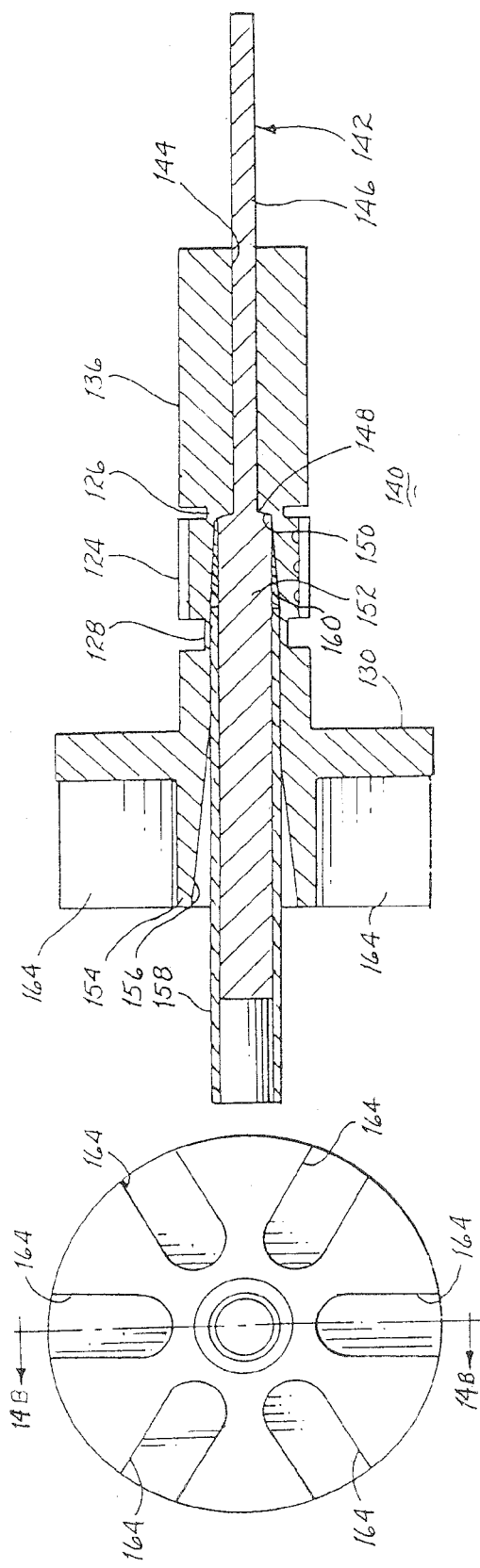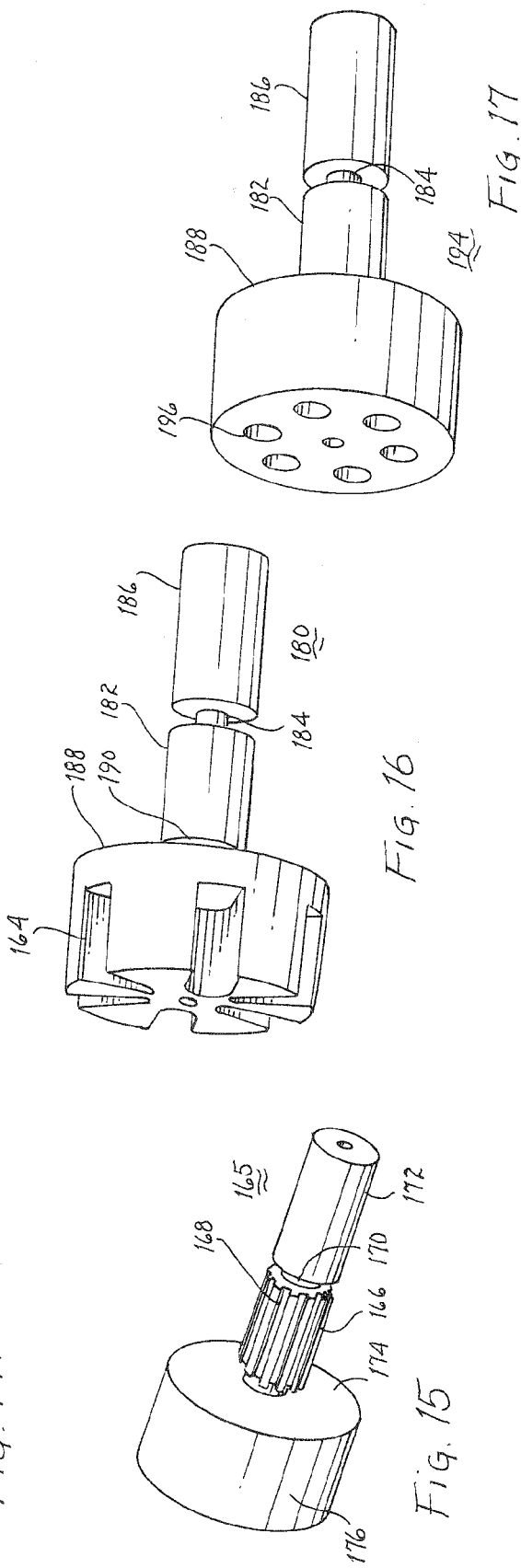

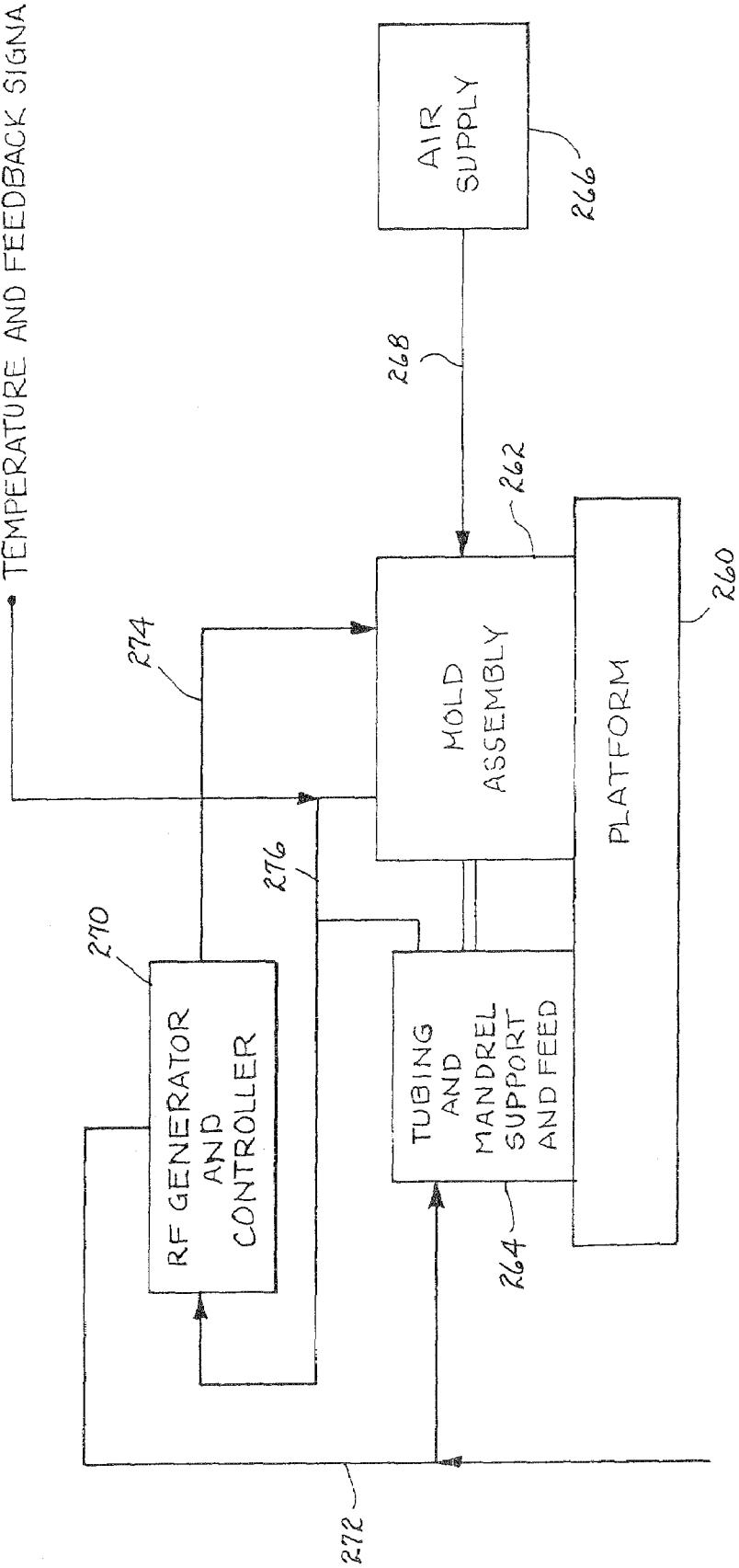

APPARATUS FOR RAPIDLY HEATING AND COOLING A MOLD

CROSS REFERENCE TO RELATED APPLICATIONS

The present application is related to and claims priority from a provisional patent application entitled "ASSEMBLY FOR RAPIDLY HEATING AND COOLING A CATHETER MOLD" filed Jan. 25, 2006 and assigned Ser. No. 60/762,204 and a provisional application entitled "RAPID HEATING AND COOLING MOLD" filed Oct. 31, 2005 and assigned Ser. No. 60/732,118.

BACKGROUND OF THE INVENTION

1. Field of the Invention

The present invention relates to apparatus for rapidly heating and cooling a mold for forming, molding or welding thermoplastic tubing and, more particularly, to a translatable spool circumscribing the mold and having a radio frequency (RF) energized heating coil to inductively heat the mold and to a manifold for directing cooling air between the mold and the spool.

2. Description of Related Prior Art

Molds used for heating, shaping molding and welding plastic tubing have employed a resistive element associated with the mold and tubing to be formed is disposed therewithin. Inductive heating of the mold has also been employed. Such heating has been at a fixed location on the mold without the capability of varying the location of application of the heat.

Cooling of molds used for forming, molding and welding tubing are cooled primarily through the use of massive heat sinks. The rate of cooling of the mold to permit withdrawal of the formed tubing is a function of the ambient temperature and the massiveness of the heat sinks. Furthermore, some benefit has been achieved through dissipation of heat by radiation from the heat sinks. Nevertheless, a significant time period is required to achieve the requisite cooling of the mold to permit withdrawal of the formed tubing. Such time constraints negatively impact throughput of the mold.

Prior art molds for use in conjunction with the forming, molding and welding of tubing are in the nature of a composite or unitary assembly having the requisite parts associated with one another to form a unit. If a different mold is to be used to achieve a different operation of forming, molding and/or welding of the tubing, a new unit must be constructed. Without the capability of using substitutable subassemblies related to the mold itself, significant costs are incurred by having to develop a complete unit for each type of operation to be achieved.

SUMMARY OF THE INVENTION

The present invention includes apparatus for forming, molding or welding thermoplastic tubing. A dissassembleable housing supports the various components and accommodates rapid and facile substitution of the components to satisfy the parameters of the various functions to be performed. A spool supporting a coil energized by radio frequency (RF) energy includes a central aperture surrounded by the coil and is supported by the housing. A mold having a center section extends through the aperture in the spool to locate the center section generally coincident with the coil. A manifold provides a flow of air into the space between the center section and the aperture to draw heat from the mold and cool the mold after the tubing has been formed, molded or welded. A lead screw and guide pin support the spool within the housing and permit translation of the spool along the center section to locate the heat zone at a preferred location. The mold is removably mounted between the base and top of the housing to permit interchangeability. A passageway extending through the mold permits use of a mandrel to support the tubing for certain operations. To accommodate certain operations wherein the mold or weld produced is larger than the passageway in the mold, a split mold may be used; the space between the central section and the aperture in the spool is sufficient to accommodate separation of the mold and withdrawal of the molded or welded tubing. The housing supports a manifold that injects streams of air into the space between the aperture in the spool and the center section of the mold or a manifold that provides an annular stream of air flowing about the center section of the mold within the aperture of the spool. Either type of manifold permits the use of the mandrel. By using thermal chokes and relatively massive components of the mold, the benefits of a heat sink in combination with the cooling air is achieved. Thereby, rapid heating and cooling of the mold is achieved to enhance throughput.

It is therefore a primary object of the present invention to provide rapid heating and cooling of a mold for forming, molding or welding plastic tubing.

Another object of the present invention is to provide a selectively energizable flow of air about a mold to induce rapid cooling.

Yet another object of the present invention is to provide a radio frequency energized coil for inductively heating a mold.

Still another object of the present invention is to provide a heater laterally adjustable along a mold to provide a predetermined heat profile along the mold.

A further object of the present invention is to provide a cooling airflow about a mold while permitting use of a mandrel to prevent collapse of plastic tubing to be formed, molded or welded.

A yet further object of the present invention is to provide a plurality of replaceable and substitutable subassemblies in an apparatus for rapidly heating and cooling plastic tubing.

A still further object of the present invention is to provide any of several differently configured mold subassemblies that may be interchangeably replaced within a housing to obtain different heat zones for tubing being formed, molded or welded.

A still further object of the present invention is to provide a split mold surrounded by a heating coil, which mold can be opened to permit removal of tubing formed, molded or welded therein without removing the mold or the heating coil.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1A is a front view of the mold apparatus;

FIG. 1B is similar to FIG. 1A except that certain internal structure is illustrated;

FIG. 1C is a right side view illustrating certain internal structure;

FIG. 1D is a top view illustrating certain internal structure;

FIG. 2 is an exploded view of the major replaceable components of the mold apparatus;

FIGS. 3A and 3B illustrate the two components of the housing apart from one another;

FIGS. 4A and 4B illustrate a manifold having a cylinder and a conical insert, respectively, for directing cooling air;

FIG. 5A illustrates a top view of the manifold;

FIG. 5B is a cross sectional view taken along lines 5B-5B, as shown in FIG. 5A;

FIG. 5C is an end view taken along lines 5C-5C, as shown in FIG. 5B;

FIG. 5D is an end view taken along lines 5D-5D, as shown in FIG. 5B;

FIG. 12A illustrates an end view of a mold having a mandrel disposed therein;

FIG. 12B is a cross sectional view taken along lines 12B-12B, as shown in FIG. 12A;

FIG. 13A illustrates an end view of a mold having a mandrel inserted within a length of tubing within the mold;

FIG. 13B is a cross sectional view taken along lines 13B-13B, as shown in FIG. 13A;

FIG. 14A is an end view of a mold on completion of a molding process on a length of mandrel supported tubing;

FIG. 14B is a cross sectional view taken along lines 14B-14B, as shown in FIG. 14A;

FIG. 15 illustrates a slotted mold and defining cooling fins;

FIG. 16 illustrates a slotted heat sink of a mold;

FIG. 17 illustrates passageways formed in a heat sink of a mold;

FIG. 23 is a schematic diagram for operation of the mold apparatus.

DESCRIPTION OF THE PREFERRED EMBODIMENT

Figures 6A, 6B, 6C:
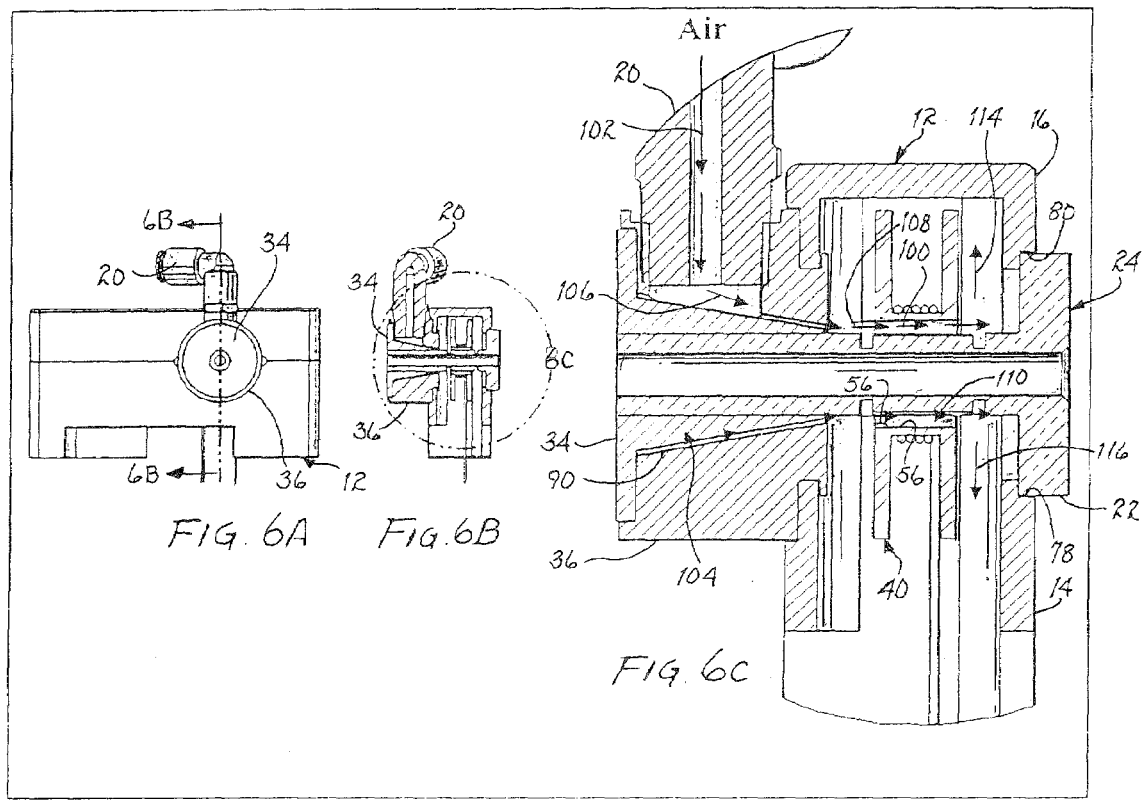
FIG. 6A is an end view of the mold apparatus showing the air inlet conduit.
FIG. 6B is a cross sectional view taken along lines 6B-6B, as shown in FIG. 6A.
FIG. 6C is an enlarged view of FIG. 6B and showing the airflow path.

Referring jointly to FIG. 1A there is shown a mold apparatus 10 having a housing 12 formed by a base 14 and a top 16. A manifold 18 is disposed on the left side and in fluid communication with a conduit 20 functionally connected to a source of air under pressure (not shown). A flange 22 of a mold 24 may extend from the right side of housing 12, as illustrated. A pair of conductors 26 may extend from within the housing for connection to an RF generator.

Referring particularly to FIGS. 1B, 1C and 1D, certain structure internal to housing 12 will be described. Top 16 and bottom 14 of housing 12 are secured to one another by bolts 30, 32 extending through apertures in top 16 and into threaded engagement with bottom 14. Mold 24 extends into housing 12 and may be threadedly engaged with cone 34 disposed within manifold 18. A spool 40 includes a central aperture for penetrable engagement with mold 24. Conductors 26 are wrapped about the spool to form a coil and, upon energization, will cause inductive heating of the circumscribed central section of the mold.

FIG. 2 illustrates an exploded view of the basic components supported by housing 12. Manifold 18 includes a cylinder 36 having a cone shaped interior surface commensurate with the surface of cone 34 but of larger size to provide a cone shaped space therebetween. Cylinder 36 includes an inlet 38 in fluid communication with conduit 20 to introduce air into the space between the cylinder and the cone. Cylinder 36 includes an annular ridge 42 for engagement with a correspondingly sized partial annular groove 44 formed in base 14 and a partial annular groove 46 formed in top 16. Spool 40 includes a threaded passageway 48 in at least one of the discs forming the spool and a further passageway 50 in each of the discs forming the spool. A machine screw 52 is supported intermediate base 14 and top 16 in commensurately configured grooves and it is in threaded engagement with threaded passageway 48. A pin 54 is rotatably supported in commensurate grooves in base 14 and top 16 and is in non threaded penetrable engagement with passageways 50. Upon rotation of screw 52, spool 40 will be translated left to right and right to left and rotation of the spool is precluded by its sliding engagement with pin 54. Mold 24 extends through and in non contacting relationship with aperture 54 formed at the center of spool 40 to form an annular space between the aperture and the encircled mold. In one embodiment, end 58 of the mold may be in threaded engagement with the center of cone 34.

FIGS. 3A and 3B illustrate housing 12 in further detail. Base 14 includes threaded passageways 60, 62 for receiving a bolt 32, 30, respectively (shown in FIG. 1C). After passage of the bolts through non threaded passageways 64, 66, respectively, semi-circular grooves 70 and 72 are formed in base 14 and top 16 to accommodate rotational movement of screw 52 (see FIG. 2). Similarly, semi-circular grooves 74, 76 are formed in the base and in the top to accommodate pin 54. Semi circular grooves 44, 46 are formed in base 14 and top 16 to nestingly receive annular ridge 42 of cylinder 36. Further semi-circular grooves 78, 80 are formed in base 14 and top 16 to nestingly receive flange 22 of mold 24 (see FIG. 2).

FIGS. 4A and 4B illustrate further details attendant cylinder 36 and cone 34. In particular, cylinder 36 includes an interior cone shaped surface 82 dimensioned to receive cone 34 while providing an annular tapered space therebetween. The positioning of the cone with respect to the cylinder is accomplished by an annular recess 84 formed in the cylinder to receive and positionally maintain disc 86 of the cone. Thereby, the space between cone 34 and surface 82 is maintained uniform and of a predetermined dimension.

Referring jointly to FIGS. 5A, 5B, 5C and 5D, the details attendant manifold 18 will be described in greater detail. Air under pressure is conveyed through a conduit 20 (see FIG. 2) to inlet 38 of cylinder 36. The air enters the space 90 between cone shaped surface 82 of cylinder 36 and the exterior surface of cone 34. As particularly shown in FIG. 5C, outflow of air from space 90 is in the manner of an annular flow of air representatively identified by numeral 92. As will be described below in further detail, a mold is inserted through passageway 94 within cone 34. Thereby, annular flow of air 92 will essentially bathe the circumference of the mold inserted through passageway 94. It may be noted that the introduction and flow of cooling air described will not impede or otherwise affect insertion/removal of a mold nor will it preclude or create any impediment to insertion/removal of the mandrel with respect to a mold.

FIGS. 6A, 6B and 6C duplicate certain of the structure shown in FIGS. 5A-D but include additional subject matter and the relationships therebetween. Accordingly, only the additional subject matter shown in FIGS. 6A, 6B and 6C will be described in detail. FIG. 6C illustrates a representative mold 24 having an annular flange 22 positionally lodged within semi circular grooves 78, 80 in base 14 and top 16, respectively, of housing 12. A spool 40, shown in FIG. 2, is supported by a screw 52 and a pin 54 penetrably engaging and receiving support from housing 12. Thereby, the concentric position of the spool is maintained relative to the housing. Mold 24 extends through aperture 56 in the spool in spaced relationship therefrom to provide an annular passageway 100 between the aperture of the spool and the surface of mold 24. Air flowing through conduit 20 enters cylinder 36, as described above, and is channeled radially inwardly about cone 34 through hollow cone shaped space 90 between cylinder 36 and cone 34. This flow of air is representatively illustrated by arrows 102, 104 and 106. As particularly shown in FIG. 5C, the outflowing air surrounds mold 24 and continues to flow along the mold and through annular passageway 100 disposed between the surface of aperture 56 of spool 40 and the surface of mold 24. This flow of air is represented by arrows 108 and 110. Air flowing out of annular space 100 flows into the interior of housing 12, as depicted by arrows 112, 114 and is ultimately exhausted into the atmosphere. Thereby, the mold, after having been heated, may be rapidly cooled by the air flowing therepast.

Figures 7A, 7B:
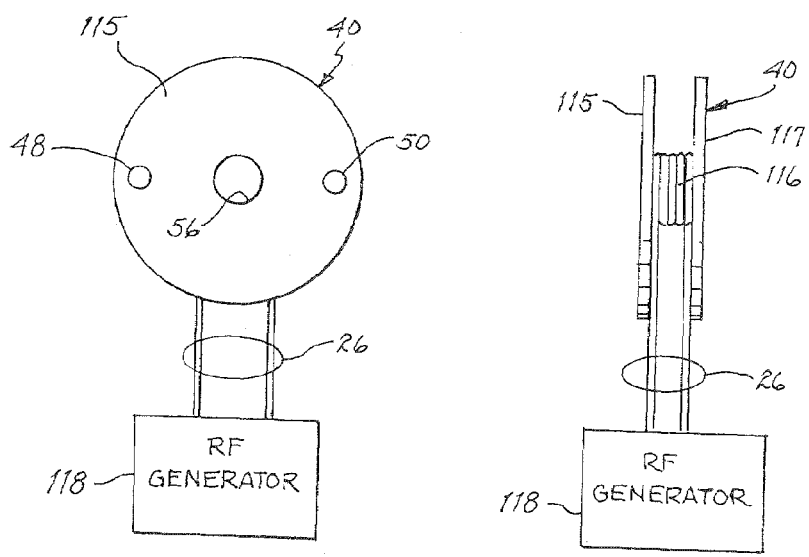
FIG. 7A is an end view of a spool for generating heat about the mold.
FIG. 7B is a side view of the spool shown in FIG. 7A.

FIGS. 7A and 7B illustrate spool 40 in further detail. The spool includes a pair of discs 115, 117 joined to one another with a cylinder or similar element to provide a passageway 94 therethrough. As discussed above, this passageway is of a diameter greater than the diameter of the mold to be inserted therein to accommodate a flow of air between the surface of passageway 94 and the corresponding surface of the mold. A threaded passageway 48 is disposed in one or both of discs 116, 117 to obtain controlled translation of the spool along its axis of rotation through rotational movement of screw 52 (see FIG. 2). A pair of non threaded passageways 50 are disposed in each of discs 115 and 117 for penetrable engagement with pin 54. The combination of screw 52 and pin 54 prevent vertical and lateral movement of the spool such that the only movement of the spool can occur along its axis of rotation. A coil 116 of wire is wrapped about the cylinder or support interconnecting discs 115, 117 and opposed ends of the wire extending from the coil are identified as conductors 26. These conductors are adapted to be connected with a radio frequency (RF) generator 118 to cause heating of coil 116 and thereby inductively heat the mold proximate the surface of passageway 94. Depending upon the forming, molding or welding to be performed on plastic tubing or material, it may be beneficial in certain instances to relocate the spool to different zones along the mold. Such relocation permits control and use of different heat profiles for the material to be formed, molded or welded.

Figure 8A:
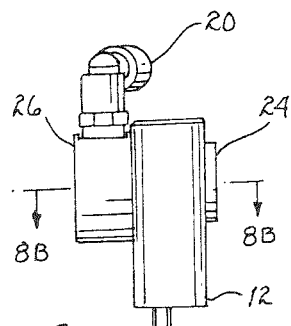
FIG. 8A is a front view of the mold apparatus.
Figure 8C:
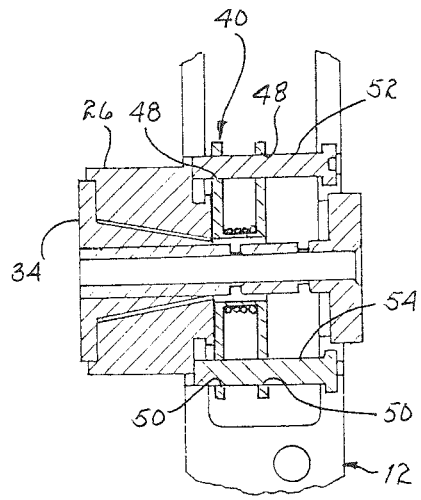
FIG. 8C is an enlarged view taken within circle 8C shown in FIG. 8B and illustrating the location of the spool at the left side.
Figure 8B:
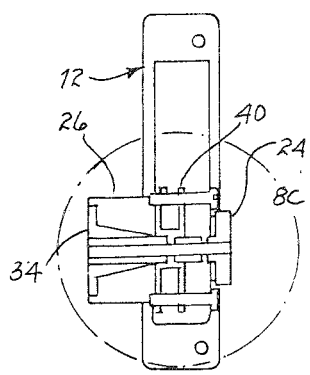
FIG. 8B is a cross sectional view taken along lines 8B-8B, as shown in FIG. 8A.

FIGS. 8A, 8B and 8C illustrate structure similar to the structure shown in FIGS. 6A-C except that the structure accommodating repositioning of the spool is particularly shown. Screw 52 is turned. Upon such turning, the threads of the screw will engage with the threads in aperture(s) 48 of spool 40 will cause axial translation of the spool to the left or to the right. As described above, pin 54 is primarily a positioning element engaging apertures 50 in the discs of the spool. FIG. 8C illustrates spool 40 in the left most position.

Figure 9A:
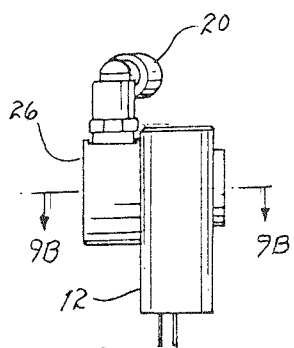
FIG. 9A is a front view of the mold assembly.
Figure 9C:
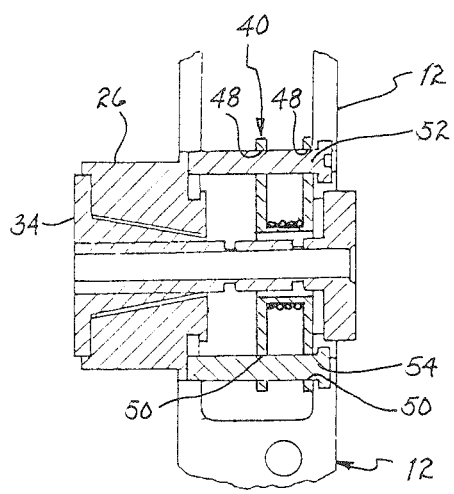
FIG. 9C is an exploded view taken within circle 9C shown in FIG. 9B and illustrating the spool on the right side.
Figure 9B:
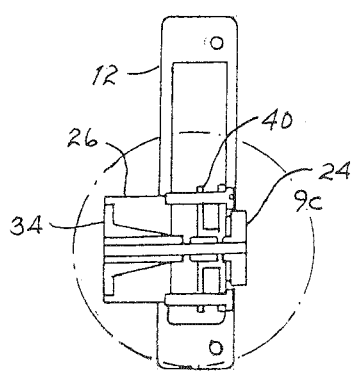
FIG. 9B is a cross sectional view taken along lines 9B-9B, as shown in FIG. 9A.

FIGS. 9A, 9B and 9C show structure essentially equivalent with the structure shown in FIGS. 8A, 8B and 8C except that spool 40 is shown as having been translated to the right most position.

Figure 10A:
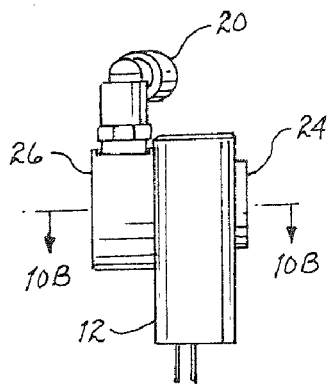
FIG. 10A is a front view of the mold apparatus.
Figure 10C:
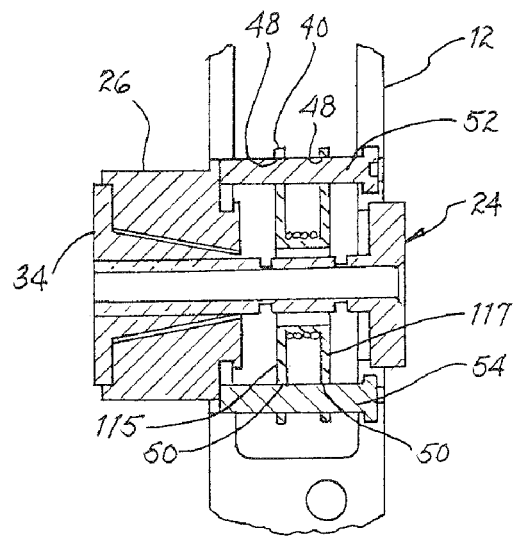
FIG. 10C is an exploded view taken within circle 10C shown in FIG. 10B and illustrating the spool at a midpoint.
Figure 10B:
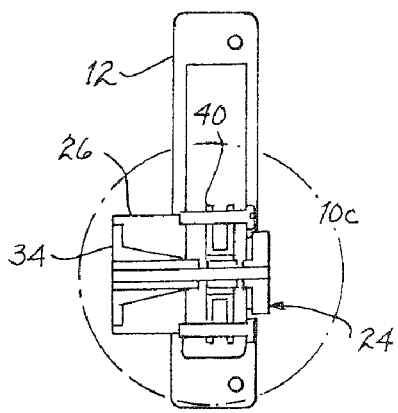
FIG. 10B is a cross sectional view taken along lines 10B-10B, as shown in FIG. 10A.

FIGS. 10A, 10B and 10C show structure essentially equivalent with the structure shown in FIGS. 9A, 9B and 9C, except that spool 40 is shown as being essentially centered. Furthermore, screw 52 and pin 54 for repositioning the spool are shown in engagement with housing 12 and discs 115, 117 of the spool. As will be noted by inspection of FIGS. 8C, 9C and 10C, the heat zone generated by spool 40 can be created toward the left of the mold, toward the right of the mold or centered on the mold. Stated another way, different heat profiles for the mold can be created as a function of the position of spool 40 relative to mold 240. This capability of focusing the heat zone on a particular location of the plastic tubing to be formed, molded or welded within the mold is of special benefit for unique configurations to be fabricated.

Figure 11A:
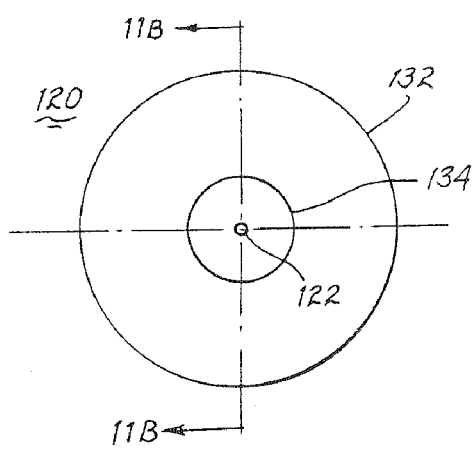
FIG. 11A is an end view of a typical mold to be used in the mold apparatus.
Figure 11B:
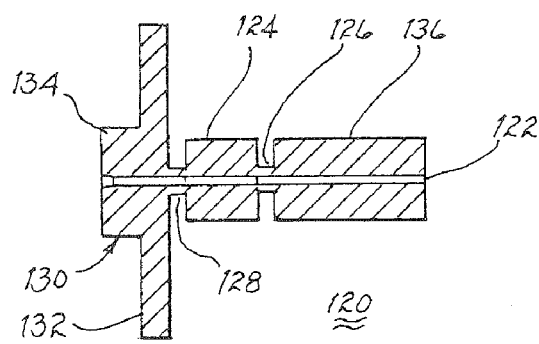
FIG. 11B is a cross sectional view taken along lines 11B-11B, as shown in FIG. 11A.

FIGS. 11A and 11B illustrate a typical mold used to form, mold or weld plastic tubing. Mold 120 includes an internal passageway 122 for receiving tubing to be formed, molded or welded. A center section 124 corresponds in location with the variable positions of spool 40, as described above. The center section is part of the mold that is heated inductively by energizing the coil in the spool. To permit rapid heating of center section 124, thermal chokes 126 and 128 are disposed at opposed ends of the center section. These thermal chokes are in the nature of a reduced diameter to discourage heat transfer from the center section. Thereby, rapid heating of the center section will occur. A large heat sink extends from thermal choke 128. As illustrated, it may include a large radial flange 132 to enhance radiation of heat therefrom along with a cylindrical section to absorb heat and radiate heat from its surface. To the right of thermal choke 126 is a cylinder 136, which may be in threaded engagement with cone 34 disposed within cylinder 36. The massiveness of cylinder 136 serves in the manner of a heat sink to draw heat from thermal choke 126 and the heat transferred to this heat sink through thermal choke 126 will be radiated from the surface of the heat sink.

Referring jointly to FIGS. 12A, 12B, 13A, 13B and 14A, 14B, there is shown in detail a representative type of mold that may be used with the present invention. For certain end use applications, it is necessary to have a length of plastic tubing with a tapered end. Such tapering can be achieved with mold 140 shown in these figures. This mold is similar to mold 120 shown in FIGS. 11A and 11B except that a mandrel 142 has been inserted into central passageway 144. The mandrel includes a rod 146 in engagement with central passageway 144 extending through cylinder 136. A shoulder 148 of the mandrel butts up against radial expansion 150 of the central passageway extending through center section 124 and heat sink 130. The radially expanded section 152 of mandrel 142 is uniform. Central passageway 144 expands radially in the manner of a taper from the end of center section 124 adjacent thermal choke 126 to end of center section 124 adjust thermal choke 128. To facilitate insertion of the mandrel with tubing mounted thereon, central passageway 144 may be further tapered, as represented by numeral 156 to provide a larger opening to the mold.

In operation, mandrel 142 is inserted into central passageway 144 until shoulder 148 butts up against radial expansion 150. Tubing 158 is slid along expanded section 152 of mandrel 142 until the tubing comes in contact with the surface of central passageway 144. Because the passageway within center section 124 is tapered commensurate with the taper sought for the end of the tubing, the tubing must be heated to form or mold it to the tapered shape required. At this point, spool 40 is energized to cause heating of the center section. Simultaneously, the tubing is urged to the right into the taper of the center section. The heating of the center section will soften the tubing sufficiently to permit the tubing to slide to the right and become molded into a taper 160, as particularly shown in FIG. 14B. On completion of the molding of the tubing, the spool is de-energized and a flow of air is initiated to cause cooling of center section 124 of the mold. Such cooling will stabilize the molded tubing and permit withdrawal.

As particularly illustrated in FIGS. 12A, 13A and 14A, heat sink 130 may include a plurality of slots 164 formed therein to increase the surface area and thereby enhance radiation of heat.

FIGS. 15, 16, 17 and 18 illustrate various external configurations for a mold useable in the present invention. FIG. 15 illustrates a mold 165 with a center section 166 having a plurality of slots 168 extending axially there along. The purpose of these slots is primarily that of enhancing the rapidity with which the center section will cool. This may be done by enhancing the surface area of the center section. A thermal choke 170 interconnects the center section with a cylindrical section 172 that serves the function of a heat sink; it also may be mechanically secured to cylinder 36 or cone 34. A further choke 174 interconnects the center section with a massive heat sink 176 to assist in dissipating the heat generated during a forming, molding or welding process.

Mold 180, shown in FIG. 16, is similar to mold 165 except that center section 182 is in the form of a smooth cylinder. A thermal choke 184 interconnects the center section with a heat sink 186 that may be connected to either cylinder 36 or cone 34. Heat sink 188 is connected with center section 182 through a thermal choke 190. To assist in dissipating heat from heat sink 188, it may include the types of slots 164 discussed above with respect to FIGS. 12, 13 and 14. Mold 194 shown in FIG. 17 is similar to mold 180 shown in FIG. 16 except that heat sink 188 includes a plurality of passageways 196 extending through the heat sink to increase the surface area thereof and aid in dissipation of heat.

Figure 18:
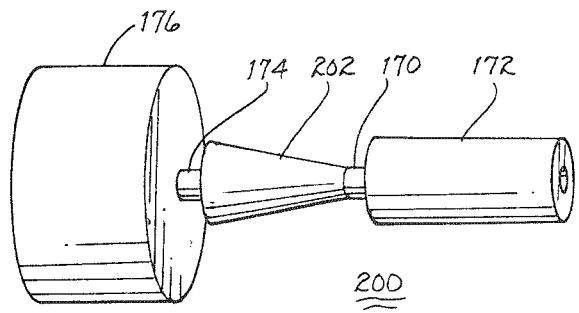
FIG. 18 illustrates a mold having a tapered exterior.

FIG. 18 illustrates a mold 200 that is very similar to mold 180 shown in FIG. 16 with one significant variation. Herein, center section 202 is tapered. Such tapering, in combination with the position of spool 40 there along permits the creation of a specific type of heat profile for the tubing being formed, molded or welded. With such control of the heating being performed, many special purpose and unique functions of shaping, molding and welding of plastic tubing can be performed.

Figure 19A:
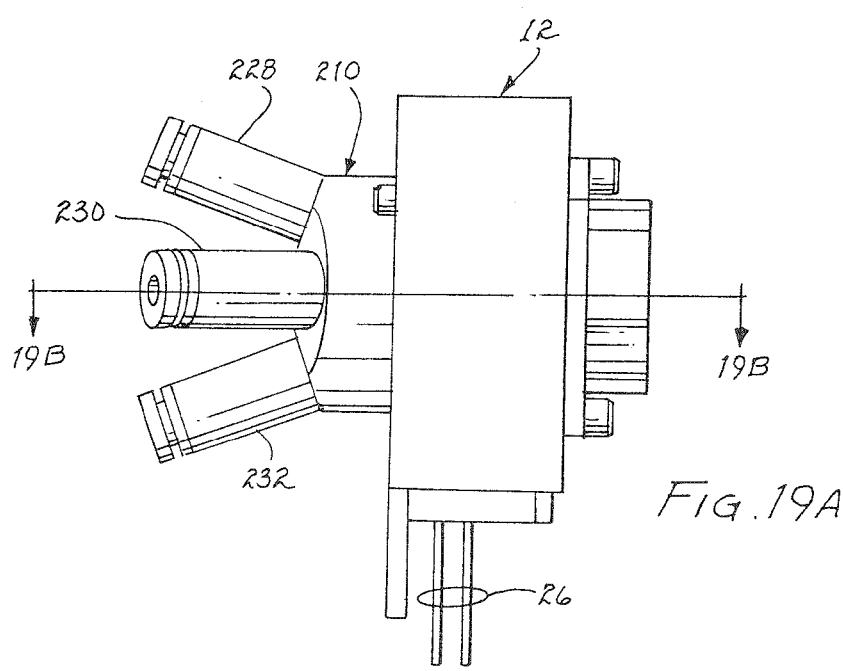
FIG. 19A illustrates a variant structure for directing airflow to and about a mold.
Figure 19B:
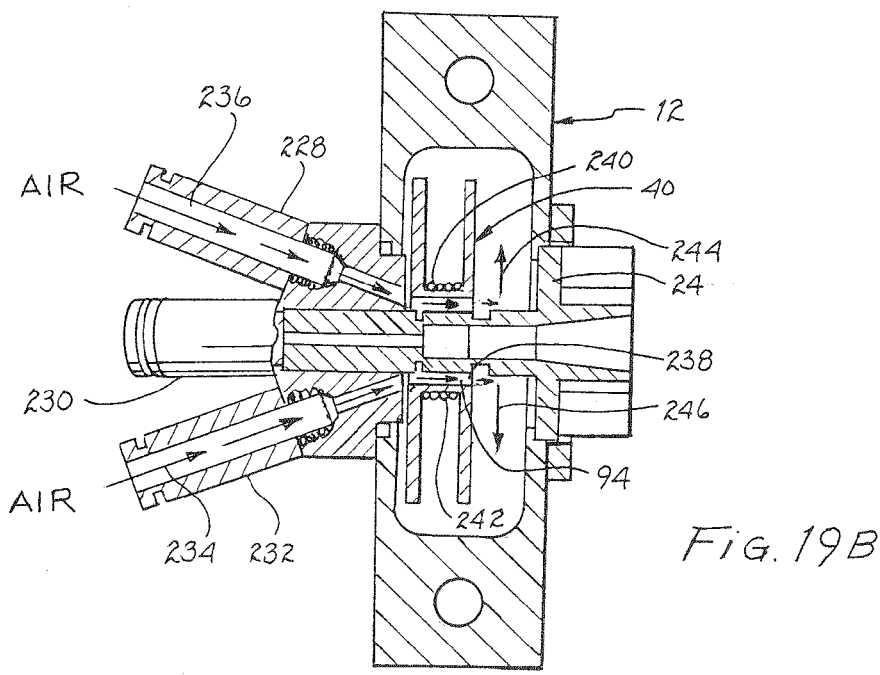
FIG. 19B is a cross sectional view taken along lines 19B-19B, as shown in FIG. 19A.
Figure 20B:
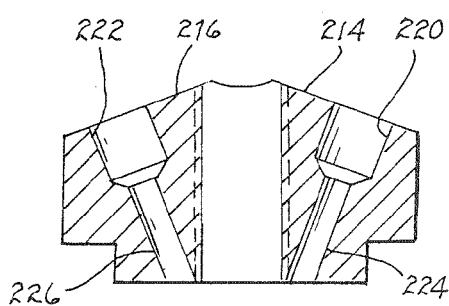
FIG. 20B is a cross sectional view taken along lines 20B-20B, as shown in FIG. 20A.
Figure 20A:
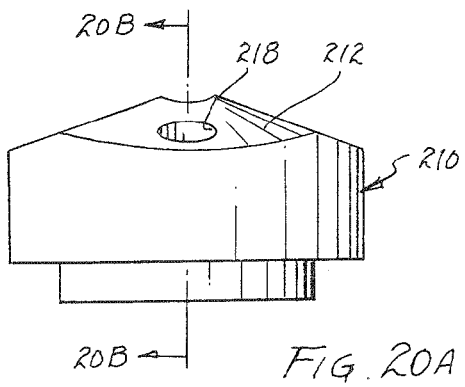
FIG. 20A illustrates a manifold depicted in FIGS. 19A and 19B.
Figure 21A:
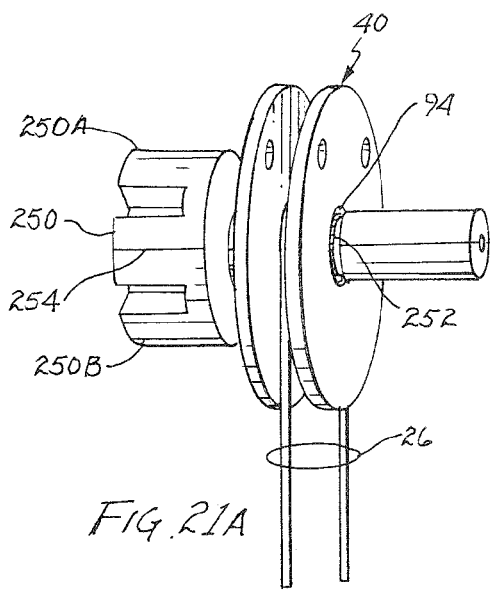
FIG. 21A illustrates a split mold in penetrating engagement with a spool and FIG. 21B is a cross sectional view thereof.

Referring jointly to FIGS. 19A, 19B, 20A and 20B an alternate form of directing cooling air intermediate the spool and the center section of the mold will be described. A manifold 210 is attached to housing 12 in the same manner as cylinder 36 described above. This manifold includes three angled faces, of which face 212 is shown in FIG. 20A and faces 214, 216 are shown in FIG. 20B. Inlets 218, 220 and 222 are formed in these faces, as illustrated. Each of these inlets includes a passageway, of which passageways 224 and 226 are shown in FIG. 20B. These passageways are angled, as illustrated, to direct a flow of air into passageway 94 intermediate center section 238 of the mold and aperture 56 of spool 40. Quick disconnect fittings 228, 230 and 232 are in threaded engagement with inlets 218, 220, 222. Tubing from a source of air under pressure is connected to each of fittings 228, 230 and 232 to provide a combined source of air.

As particularly illustrated in FIG. 19B, air flows through the fittings, inlets and passageways, as represented by arrows 234, 236. This airflow continues intermediate center section 238 of mold 24 and aperture 56 of spool 40 as representatively illustrated with arrow 240, 242. Thereafter, the air is exhausted into housing 12, as represented by arrows 244, 246. Thereby, center section 238 of mold 24 is bathed in cooling air upon cessation of application of heat to the center section by de-energizing the coil in spool 40. As discussed above, the thermal chokes on either side of the center section tend to contain the heat in the center section and enhance heating wherefrom the heat is dissipated by the enveloping airflow. Such rapid cooling, whether in the presently described embodiment or the previously embodiment, greatly minimizes the time for forming, molding or welding plastic tubing. With such reduced times, the through put of the apparatus is greatly enhanced.

Some types of forming or welding plastic tubing will result in a radially expanded junction or element in conformance with a radially expanded cavity in the center section of the mold. To permit withdrawal of the expanded section of the tubing, the mold must be split to expand the entry/exit passageway of the mold.

Figure 22A:
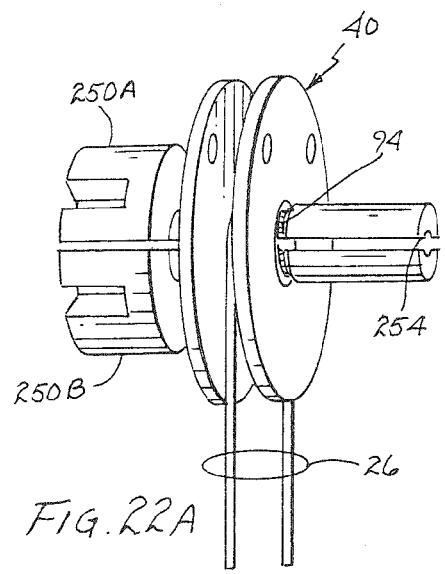
FIG. 22A illustrates the split mold with the halves thereof displaced from one another and FIG. 22B is a cross sectional view thereof.
Figure 21B:
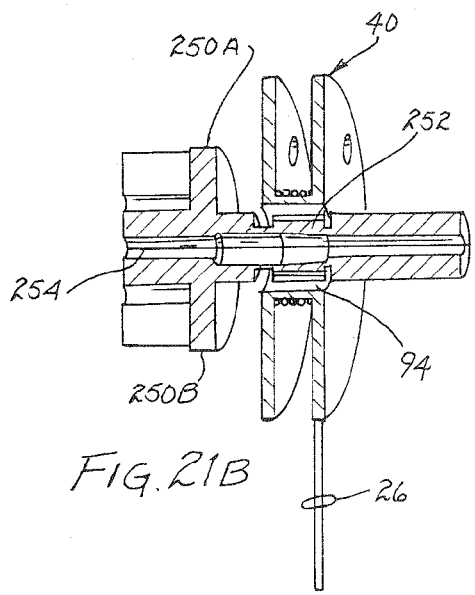
Figure 22B:
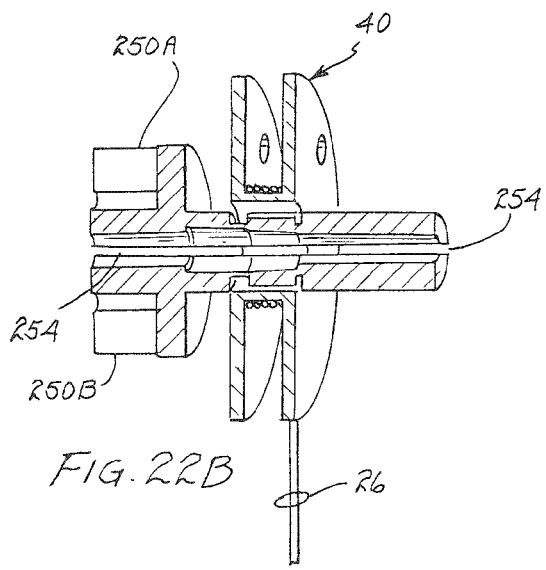

Referring jointly to FIGS. 21A, 21B, 22A and 22B, adaptability of the present invention to accommodate a split mold will be described. For purposes of commonality, reference numerals previously used for like elements will be incorporated herein. Spool 40 is mounted upon split mold 250. As particularly shown in FIGS. 21A and 21B, there is an annular passageway 94 between the surfaces of aperture 56 and center section 252 of the mold. For convenience of nomenclature, the halves of mold 250 will be designated as 250A and 250B. Split line 254 delineates the junction between mold halves 250A and 250B. After completion of the forming, molding or welding operation on the plastic tubing, mold 250 is split, as illustrated in FIGS. 22A and 22B. With such splitting, the bulbous portion of the tubing formed within center section 252 of mold 250 can now be withdrawn through inlet passageway 254 in the mold. It is to be noted that passageway 94 is sufficiently sized to accommodate the splitting of the mold within the air space intermediate the center section of the mold aperture 56 in the spool, which define passageway 94.

FIG. 23 illustrates the environment of the present invention. In particular, a work place or platform 260 supports mold assembly 262, including housing 12. The insertion and withdrawal of a mandrel, when used, along with insertion and withdrawal of plastic tubing is provided by a support and feed unit 264. It is to be understood that this unit also supports the mandrel prior to and after insertion into the mold assembly. The air for cooling purposes is provided by air supply 266 conveying air under pressure through a conduit 268 to the mold assembly. An RF generator and controller 270 is connected to support and feed unit 264 through conductor(s) 272. The signals transmitted by the controller through conductor(s) 272 may control the transport of the tubing into the mold, the duration the tubing is within the mold and the withdrawal of the tubing. Additionally, signals to control transport of a mandrel, when used, into and out of the mold assembly may be provided by the controller. Through a further conductor(s) 274, RF energy is supplied to the coil in the spool to cause the coil to inductively heat the encircled center section of the mold. A further conductor(s) 276 provides feedback signals to RF generator and controller 270. These feedback signals may be of many types, including temperature indication at one or more locations, signals reflective of the position of one or more of the moveable components and signals reflective of the air flow rate and/or temperature. The operation of the split mold discussed above may also be controlled by RF generator and controller 270 and the split mold may be capable of generating feedback signals to enhance its operation.

The timing and operation of the present invention may be controlled by various techniques. In particular, a microprocessor may be used with appropriate timing and sensing functions to perform the operations upon actuation of an initiating signal, such as a push button. In view of the miniaturization of microprocessors and the like, the requisite electronic components may well be secured within housing 12 to provide a small, compact unit. Necessarily, the power supplies for the electronic circuitry and a source of air under pressure are expected to be located externally of housing 12. While a flow of air has been discussed as the cooling medium, it is to be understood that another gas having more useful properties could be used instead. For example, nitrogen gas from a source of liquid nitrogen could be used.

We claim:

1. An apparatus for rapidly heating and cooling plastic tubing to be formed, molded or welded, said apparatus comprising in combination:
   a) a mold for the plastic tubing;
   b) a spool supporting a coil for inductively heating said mold, said spool including an aperture for encircling said mold at a distance from said mold to define an air space about said mold;
   c) a source of gas; and
   d) a manifold for receiving the gas from said source of gas and for directing the gas through the space intermediate said mold and said spool after the plastic tubing has been heated to cause rapid dissipation of heat from said mold and cooling of said mold.

2. The apparatus as set forth in claim 1, including an RF generator for providing RF energy to said coil to inductively heat said mold.

3. The apparatus as set forth in claim 1 wherein said mold includes a center section generally coincident with the aperture in said spool, a first thermal choke on one side of said center section; a first heat sink extending from said first thermal choke, a second thermal choke on the other side of said center section and a second heat sink extending from said second thermal choke.

4. The apparatus as set forth in claim 3, including a passageway disposed in said mold for receiving and supporting the plastic tubing.

5. The apparatus as set forth in claim 2, wherein said manifold includes an annular outlet adapted to direct a flow of cooling gas about the exterior surface of said center section.

6. An apparatus for rapidly heating and cooling plastic tubing to be formed, molded or welded, said apparatus comprising in combination:
   a) a mold for the plastic tubing;
   b) a spool supporting a coil for inductively heating said mold, said spool including an aperture for encircling said mold at a distance from said mold to define an air space about said mold;
   c) an RF generator for providing RF energy to said coil to inductively heat said mold;
   d) a source of gas; and
   e) a manifold for receiving the gas from said source of gas and for directing the gas through the space intermediate said mold and said spool after the plastic tubing has been heated to cause rapid dissipation of heat from said mold and cooling of said mold, said manifold including an annular outlet adapted to direct a flow of cooling gas about the exterior surface of said center section and an inlet for receiving the cooling gas, a cone shaped interior surface in fluid communication with said inlet, a cone disposed within and spaced apart from said interior surface to define said annular outlet for directing the cooling gas about said center section.

7. An apparatus for rapidly heating and cooling plastic tubing to be formed, molded or welded, said apparatus comprising in combination:
   a) a mold for the plastic tubing, including a center section extending into said aperture of said spool, means for selectively repositioning said spool along said center section to provide a heat profile along said center section;
   b) a spool supporting a coil for inductively heating said mold, said spool including an aperture for encircling said mold at a distance from said mold to define an air space about said mold;
   c) a source of gas; and
   d) a manifold for receiving the gas from said source of gas for directing the gas through the space intermediate said mold and said spool after the plastic tubing has been heated to cause rapid dissipation of heat from said mold and cooling of said mold.

8. The apparatus as set forth in claim 1, wherein said mold includes a passageway extending axially therethrough for receiving a mandrel to support a length of plastic tubing to be formed, molded or welded within said mold.

9. The apparatus as set forth in claim 3, wherein said manifold includes a plurality of inlets for receiving the cooling gas and a corresponding number of passageways for directing the cooling gas about said center section.

10. The apparatus as set forth in claim 1, wherein said mold is split into first and second parts to permit withdrawal of a formed, molded or welded length of plastic tubing upon lateral displacement of the first and second parts relative to one another and within said aperture of said spool.

11. An assembly for molding catheter tubing, said assembly comprising in combination;
    a) a catheter mold;
    b) a coil encircling said mold for heating said mold by induction;
    c) a housing for supporting said mold and said coil;
    d) an annular space disposed intermediate said mold and said coil; and
    e) a manifold for directing a stream of air at least into said space for cooling said mold on completion of heating the mold.

12. The apparatus as set forth in claim 11, wherein said mold includes a passageway extending therethrough for receiving a mandrel to support the tubing within said mold.

13. The apparatus as set forth in claim 11, wherein said manifold includes an annular outlet for directing the stream of air into said space.

14. An assembly for molding catheter tubing, said assembly comprising in combination;
    a) a catheter mold;
    b) a coil encircling said mold for heating said mold by induction;
    c) means for relocating said coil along a section of said mold to concentrate heating at a location along said section;
    d) a housing for supporting said mold and said coil;
    e) an annular space disposed intermediate said mold and said coil; and
    f) a manifold for directing a stream of air at least into said space for cooling said mold on completion of heating the mold.

15. The apparatus as set forth in claim 11, wherein said mold includes a center section wherein the tubing is formed, molded or welded, a thermal choke disposed on each opposed side of said center section and a heat sink connected to each of said thermal chokes.

16. The apparatus as set forth in claim 15, wherein the exterior surface of said center section is slotted.

17. The apparatus as set forth in claim 15, wherein said center section is tapered.

18. The apparatus as set forth in claim 15, wherein at least one of said heat sinks is slotted.

19. An assembly for molding catheter tubing, said assembly comprising in combination;
    a) a catheter mold, said mold including a center section wherein the tubing is formed, molded or welded, a thermal choke disposed on each of opposed sides of said center section and a heat sink connected to each of said thermal chokes, at least one of said heat sinks including passageways for increasing the surface area of said heat sink;
    b) a coil encircling said mold for heating said mold by induction;
    c) a housing for supporting said mold and said coil;
    d) an annular space disposed intermediate said mold and said coil; and
    e) a manifold for directing a stream of air at least into said space for cooling said mold on completion of heating the mold.

20. An induction heated apparatus for molding thermoplastic material, said apparatus comprising in combination:
    a) a mold for forming, molding or welding the material;
    b) a coil for inductively heating said mold;
    c) a space disposed about said mold and intermediate said coil and said mold;
    d) a manifold having at least one passageway adapted for channeling a flow of air into said space to cool said mold; and
    e) a housing for supporting said mold and said manifold and for dissipating the air flow through said space.

21. The apparatus as set forth in claim 20, including a spool for supporting said coil, said spool including a central aperture defining said space between said spool and said mold.

22. An induction heated apparatus for molding thermoplastic material, said apparatus comprising in combination:
    a) a mold for forming, molding or welding the material;
    b) a coil for inductively heating said mold;
    c) a spool for supporting said coil, said spool including a central aperture defining said space between said spool and said mold;
    d) a space disposed about said mold and intermediate said coil and said mold;
    e) a manifold having at least one passageway adapted for channeling a flow of air into said space to cool said mold;
    f) a housing for supporting said mold and said manifold and for dissipating the air flow through said space; and
    g) means for relocating said spool relative to said housing for concentrating induction heating of said mold at a predetermined location on said mold.

23. The apparatus as set forth in claim 20, said mold including a center section within which forming, molding or welding of the material occurs, a thermal choke disposed on each opposed side of said center section and a heat sink extending from each of said thermal chokes.

\* \* \* \* \*